(12) United States Patent
Ahluwalia et al.

(10) Patent No.: US 11,064,064 B2
(45) Date of Patent: Jul. 13, 2021

(54) DISPLAYING WIRELESS SERVICE ICON BASED ON FREQUENCY BAND INDEXING IN 5G OR OTHER NEXT GENERATION WIRELESS NETWORKS

(71) Applicant: AT&T Intellectual Property I, L.P., Atlanta, GA (US)

(72) Inventors: Inderpreet Ahluwalia, Austin, TX (US); Yupeng Jia, Austin, TX (US); Marc Grant, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/567,819

(22) Filed: Sep. 11, 2019

(65) Prior Publication Data
US 2021/0075901 A1    Mar. 11, 2021

(51) Int. Cl.
*H04W 4/00* (2018.01)
*H04M 1/724* (2021.01)
(Continued)

(52) U.S. Cl.
CPC ........ *H04M 1/724* (2021.01); *G06F 3/04817* (2013.01); *H04W 72/0453* (2013.01); *H04W 76/10* (2018.02); *H04W 84/042* (2013.01)

(58) Field of Classification Search
CPC .............. H04M 1/72519; H04M 1/724; G06F 3/04817; H04W 76/10; H04W 72/0453; H04W 84/042
(Continued)

(56) References Cited

U.S. PATENT DOCUMENTS

2009/0303941 A1* 12/2009 Naka ................. H04W 72/0406
370/329
2011/0211541 A1* 9/2011 Yuk ................... H04L 25/03834
370/329
(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 15)." 3rd Generation Partnership Project; Apr. 2019. 948 pages.
(Continued)

*Primary Examiner* — Mang Hang Yeung
(74) *Attorney, Agent, or Firm* — Amin, Turocy & Watson, LLP

(57) ABSTRACT

A system for displaying a wireless service icon receives a message from a network device of a wireless network to which a mobile device is attempting to connect, wherein the message comprises layer indication data representative of a functionality of the network device of the wireless network and an index value associated with first frequency bands supported by the network device and based on a type of the mobile device, analyzing the layer indication data and the index value. The system can further comprise in response to determining a condition associated with the index value is satisfied based on a result of the analyzing, determining whether a frequency band allocated to the mobile device is included in the first frequency bands and in response to the frequency band allocated to the mobile device being determined to be included in the first frequency bands, generating first display data.

20 Claims, 12 Drawing Sheets

(51) Int. Cl.
*G06F 3/0481* (2013.01)
*H04W 76/10* (2018.01)
*H04W 72/04* (2009.01)
*H04W 84/04* (2009.01)

(58) Field of Classification Search
USPC .......................................................... 370/329
See application file for complete search history.

(56) References Cited

U.S. PATENT DOCUMENTS

| | | | |
|---|---|---|---|
| 2013/0337811 A1* | 12/2013 | Faerber | H04W 36/0083 |
| | | | 455/436 |
| 2018/0279309 A1* | 9/2018 | Takahashi | H04J 11/00 |
| 2018/0368086 A1 | 12/2018 | Bai et al. | |
| 2019/0053175 A1 | 2/2019 | Kubota et al. | |
| 2019/0069205 A1* | 2/2019 | Lee | H04W 48/20 |
| 2020/0029377 A1* | 1/2020 | Chow | H04W 24/08 |

OTHER PUBLICATIONS

Ericsson. "5G indicator for EN-DC." 3GPP TSG-RAN WG2 #100, Reno, Nevada, USA, Nov. 27-Dec. 1, 2017. 21 pages.
Qualcomm Incorporated, et al. "Consideration on the GSMA NR indication requirements." 3GPP TSG-RAN WG2 Meeting #101. Athens, Greece, Feb. 26-Mar. 2, 2018. 3 pages.
Notice of Allowance received for U.S. Appl. No. 16/441,550 dated Nov. 12, 2020, 29 Pages.

* cited by examiner

Current: System Information Block Type2
Information Element

```
PLMN-InfoList-r15 ::=    SEQUENCE (SIZE (1..maxPLMN-r11)) OF PLMN-Info-r15

PLMN-Info-r15 ::=    SEQUENCE {
    upperLayerIndication-r15    ENUMERATED {true}    OPTIONAL    -- Need OR
}
-- ASN1STOP
```

Proposed: System Information Block Type2
Information Element

```
PLMN-InfoList-r15 ::=    SEQUENCE (SIZE (1..maxPLMN-r11)) OF PLMN-Info-r15

PLMN-Info-r15 ::=    SEQUENCE {
    upperLayerIndication-r15    ENUMERATED {true}    OPTIONAL    -- Need OR
    upperLayerIndication-r15-TX
}
-- ASN1STOP
```

FIG. 5

| NRSupportedBandsIndex | NR Bands supported by the EUTRA cell |
|---|---|
| 00 | n1 |
| 01 | n2 |
| 02 | n3 |
| : | : |
| 31 | n257 |
| 32 | n258 |
| 33 | n260 |
| 34 | n261 |
| 35 | n2, n260 |
| 36 | n1, n258 |
| 37 | n78, n257 |
| : | : |
| 255 | : |

| NRSupportedBandsIndex | NR Bands supported by the EUTRA cell |
|---|---|
| 00 | n1 |
| 01 | n2 |
| 02 | n3 |
| : | : |
| 31 | n257 |
| 32 | n258 |
| 33 | n260 |
| 34 | n261 |
| 35 | n2, n260 |
| 36 | n1, n258 |
| 37 | n78, n257 |
| : | : |
| 255 | : |
| 256 | nX, nY |
| : | : |
| 512 | : |

FIG. 12B

DISPLAYING WIRELESS SERVICE ICON BASED ON FREQUENCY BAND INDEXING IN 5G OR OTHER NEXT GENERATION WIRELESS NETWORKS

TECHNICAL FIELD

This disclosure relates generally to facilitating display of icons for user equipment transitioning to various network configurations for 5G or other next generation wireless networks, e.g., facilitating displaying wireless service icon based on frequency band indexing.

BACKGROUND

5th generation (5G) wireless systems represent a next major phase of mobile telecommunications standards beyond the current telecommunications standards of $4^{th}$ generation (4G). Rather than faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

The above-described background relating to facilitating display of icons for user equipment transitioning to various network configurations is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

FIG. 5 illustrates an example schematic system block diagram of proposed changes to the SystemInformationBlockType 2 message and the proposed indexing table based on an 8-bit and a 9-bit index according to one or more embodiments.

FIG. 12A illustrates an example of a table according to one or more embodiments described herein.

FIG. 12B illustrates an example of a table according to one or more embodiments described herein.

DETAILED DESCRIPTION

Figure 1:
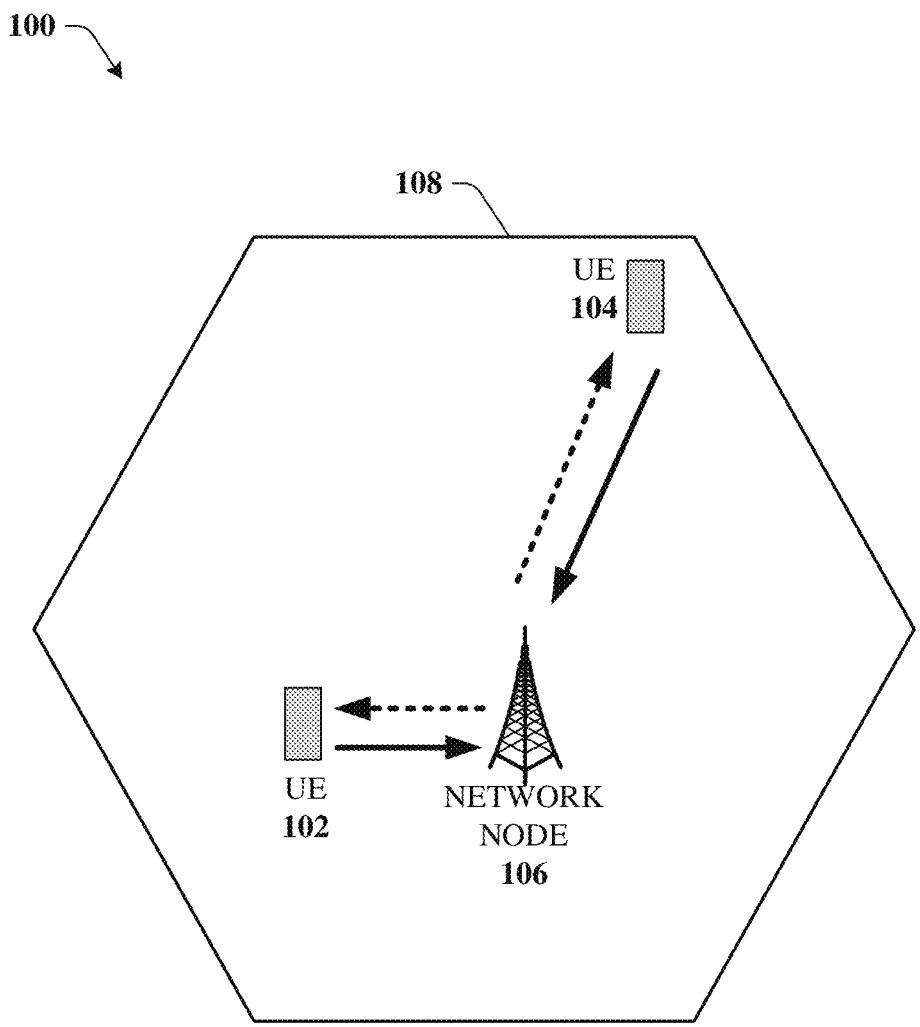
FIG. 1 illustrates an example wireless communication system in which a network node device and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate displaying a wireless service icon based on frequency band indexing. Furthermore, various embodiments are described herein to facilitate icon display for a sub6 mobile device, a millimeter wave mobile device, and/or a sub6 plus millimeter wave mobile device for a 5G air interface or other next generation networks. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long-Term Evolution (LTE), or other next generation networks, the disclosed aspects are not limited to 5G, a UMTS implementation, and/or an LTE implementation as the techniques can also be applied in 3G, 4G or other LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate displaying a wireless service icon based on frequency band indexing. Facilitating displaying a wireless service icon based on frequency band indexing can be implemented in connection with any type of device with a connection to the communications network (e.g., a mobile handset, a computer, a handheld device, etc.) any Internet of Things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles, etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception.

In some embodiments the non-limiting term radio, network node device, or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, evolved Node B (eNB or eNodeB), next generation Node B (gNB or gNodeB), network controller, radio network controller (RNC), base station controller (BSC), relay, donor node controlling relay, base transceiver station (BTS), access point (AP), transmission points, transmission nodes, remote radio unit (RRU), remote radio head (RRH), nodes in distributed antenna system (DAS), relay device, network node, node device, etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller (e.g., controller, central controller, or centralized unit) that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with or take the place of policy and charging rules function ("PCRF") network elements so that policies such as quality of service and traffic management and routing can be synchronized and managed end to end.

To meet the huge demand for data centric applications, 4G standards can be applied 5G, also called new radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., sub-carrier spacing). If the carriers use the same bandwidth spacing, then it can be considered a single numerology. However, if the carriers occupy different bandwidth and/or spacing, then it can be considered a multiple numerology.

Sub6 and millimeter wave network services can be differentiated. For example, the sub6 network can be represented by a 5G icon, and the millimeter wave network can be denoted by a 5G+ icon, which indicates that the UE can receive a higher network speed. In 5G non standalone network, of an LTE cell (e.g., anchor cell) the Upper Layer Indication in the SystemInformationBlock Type 2 message can be used to inform the UE that the cell is capable of 5G. There are several types of UE devices. For example, a first UE device can support sub6 services, a second type of UE device can support millimeter wave services, and a third type of UE device can support both sub6 and millimeter (mmW) wave services. Each of the device types can be correlated to different deployment areas (e.g., sub6 deployment area, millimeter wave deployment area, and sub6 and millimeter wave deployment area).

If a UE is provisioned for 5G in the HSS, then when the UE attaches, it can receive an "attach accept" message. A "RestrictDCNR" bit associated with the message can be absent, which means the UE is implicitly allowed on 5G, or the bit can be present and set to 0, which explicitly means the UE can be allowed on 5G. However, if the bit is present, but set to 1, then the UE is restricted from 5G. So in order to display 5G, the UE can be provisioned and have the system information block type 2 (SIB) piece present.

The first problem relates to FIGS. 2-3 (discussed later) that is an industry standards problem, wherein the second problem relates to FIG. 4 (discussed later), which is a service provider problem. Because there is only 1 bit allocated in the SIB2 message, the devices can read the SIB2 message and know that 5G is available, even if 5G is not available for that type of device. Thus a sub6 or a mmW (e.g., single mode device) can't tell if 5G is available when it is in the opposite cell configuration (e.g., FIG. 2 and FIG. 3). For sub6 and mmW combination device (e.g., a dual mode device), it knows that 5G is available and can get onto either of the 5G bands, so for a service provider that only requires a single 5G icon this is not an issue, however if a service provider requires different 5G icons, then it cannot tell which type of 5G icon to display. Thus, in idle mode, two different icons cannot be displayed based on the SIB2 message because there is only 1 bit.

The issue is further compounded by the fact that each Frequency Range is a logical grouping of different frequency bands, for example FR1 consists of numerous individual frequency bands operating in the sub-6 range and FR2 consists of numerous individual frequency bands in the millimeter wave range. When a FR1 device supporting a FR1 frequency band X enters a LTE cell that is also capable of FR1 but at frequency band Y, or a FR2 device supporting a FR2 frequency band X enters a LTE cell that is also capable of FR2 but at frequency band Y, the device sees the 1 bit allocated in the SIB2 message and enables it 5G icon erroneously because it can't tell what frequency band for FR1 o(or FR2) the network is operating on.

In another embodiment, for UE's that support the current release 15 specification, continue using a upper layer indication to facilitate displaying the wireless service icon. There are 32 FR1 bands and 4 FR2 bands currently defined in Rel-15. Utilizing 36 bits in SIB2 would be unacceptable. However, smaller increase in number of bits that can used to identify supported frequency would be advantageous. For example, using 8 or 9 or even 10 bits might be palatable to extending the SIB2 message. If 8 bits were used as an index into a table 1200 as illustrated in FIG. 12A, there would 256 index values, each associated with one or more bands supported by the network device. In some embodiments, a new element NRSupportBandsIndex (e.g., index value) into the SIB2 can be added. This index value defines an index (e.g., location) to NRSupportBandsTable. The table 1200 can be organized by index value and supported NR band(s).

The index value is a representation of the NR band(s) that the LTE cell (e.g., network node device or network device) supports. The NRSupportBandsTable lists the practical combination of NR deployments. For example, single or multiple frequency bands in FR1 and/or FR2. The exemplary 8-bit index yields 255 possible combination of index values and a 9-bit index yields up to 512 index values or combinations.

As an example, using 8-bit index, the NRSupportedBandsTable can be as illustrated by table 1200 (FIG. 12A).

In some embodiments, a 9-bit index table can be extended as illustrated by table 1250 FIG. 12B.

As NR bands are added in 3GPP, an update to the NRSupportedBandslndex and NRSupportedBandsTable is made in the appropriate specification(s). In some embodiments, from a UE perspective, when an ENDC capable UE selects and EUTRA cell (e.g., the network device to create a connection wherein the UE will received a SIB2 message), it will continue to read UpperLayerIndication from SIB2. If the UE only supports UpperLayerIndication, the UE will enable display of its 5G icon. The UE can further determine is it supports use of index value (e.g., supports NRSupportBandsIndex) to access the NRSupportBandsTable, the UE will read the index value and compare the mapped NR bands from the NRSupportedBandsTable with those that is supports. If some or all of the bands match (e.g., included in set of bands found at the index), then the UE will enable display of its 5G icon while connected to the network device. If none of the bands match, then the UE will display an LTE icon.

In one embodiment, the UE attempts to create a connection with a network device. A SIB2 message is provided to the UE with comprises an index value and upper layer indication. If the UE supports the use of index value or the NRSupportedBandsTable to determine supported bands, the UE will read the index value and look up the set of bands supported by the network device. If the supported bands match any of the UE's bands, than the UE will enable displaying of a wireless service icon, 5G. Otherwise, the UE will enable displaying of an wireless service icon, LTE.

In one embodiment, described herein is a method comprising receiving, by a mobile device comprising a processor, message data from a network device of a wireless network to which the mobile device is connected, wherein the message data comprises layer indication data representative of a functionality of the wireless network. Based on a type of the mobile device, the method can comprise analyzing, by the mobile device, the layer indication data. Additionally, in response to a condition associated with the layer indication data being determined to have been satisfied and based on the analyzing, the method can comprise generating, by the mobile device, display data representative of a wireless service associated with the functionality of the wireless network.

According to another embodiment, a system can facilitate, obtaining message data from a network device of a wireless network, wherein the message data comprises layer indication data representative of a functionality of the wireless network to which a mobile device has been determined to have connected. Based on a type of the mobile device, the system can comprise facilitating evaluating the layer indication data. Furthermore, based on a condition associated with the layer indication data being determined to have been satisfied as a result of the evaluating, the system can comprise displaying data representative of a wireless service associated with the functionality of the wireless network.

According to yet another embodiment, described herein is a machine-readable storage medium that can perform the operations comprising facilitating accessing layer indication data, representative of a functionality of a wireless network to which a mobile device has been determined to have connected, from a network device of the wireless network. Based on a type of the mobile device, the machine-readable storage medium can comprise facilitating analyzing the layer indication data by the mobile device. Additionally, in response to a condition associated with the layer indication data being determined to have been satisfied as a result of the analyzing, the machine-readable storage medium can comprise generating display data representative of a wireless service associated with the functionality of the wireless network.

According to an embodiment, a system can comprise a processor and a memory that stores executable instructions that, when executed by the processor, facilitate performance of operations comprising receiving a service request from a network device. The system can further facilitate receiving a communication from a network node device of a wireless network to which a mobile device is establishing a connection, wherein the communication comprises layer indication data representative of a functionality of network node devices of the wireless network and an index value associated with first frequency bands supported by the network node device. The system can facilitate, analyzing the layer indication data and the index value and in response to determining a condition associated with the index value is satisfied based on a result of the analyzing, determining whether a frequency band allocated to the mobile device is included in the first frequency bands. The system can further facilitate, in response to the frequency band allocated to the mobile device being determined to be included in the first frequency bands, generating first display data.

According to another embodiment, described herein is a method that can comprise receiving, by a mobile device comprising a processor, message data from a network device of a wireless network to which the mobile device is attempting to connect, wherein the message data comprises layer indication data representative of a functionality of the network device of the wireless network and an index value associated with first frequency bands supported by the network device. The method can further comprise based on a type of the mobile device, analyzing, by the mobile device, the layer indication data and the index value. The method can further comprise in response to determining a condition associated with the index value is satisfied based on a result of the analyzing, determining, by the mobile device, whether a frequency band allocated to the mobile device is included in the first frequency bands. The method can further comprise in response to the frequency band allocated to the mobile device being determined to be included in the first frequency bands, generating, by the mobile device, first display data.

According to yet another embodiment, a device can comprise a processor and a memory that stores executable instructions that, when executed by the processor, facilitate performance of operations comprising in response to requesting a connection, receiving a message from a network device of a wireless network to which a mobile device is attempting to connect, wherein the message comprises layer indication data representative of a functionality of the network device of the wireless network and an index value associated with first frequency bands supported by the network device. The device can further comprise based on a type of the mobile device, evaluating the layer indication data and the index value. The device can further comprise in response to determining a condition associated with the index value is satisfied based on a result of the evaluating, determining whether a frequency band allocated to the mobile device is included in the first frequency bands. The device can further comprise in response to the frequency band allocated to the mobile device being determined to be included in the first frequency bands, generating first display data.

These and other embodiments or implementations are described in more detail below with reference to the drawings. Repetitive description of like elements employed in the figures and other embodiments described herein is omitted for sake of brevity.

Referring now to FIG. 1, illustrated is an example wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, millimeter wave networks and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multicarrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
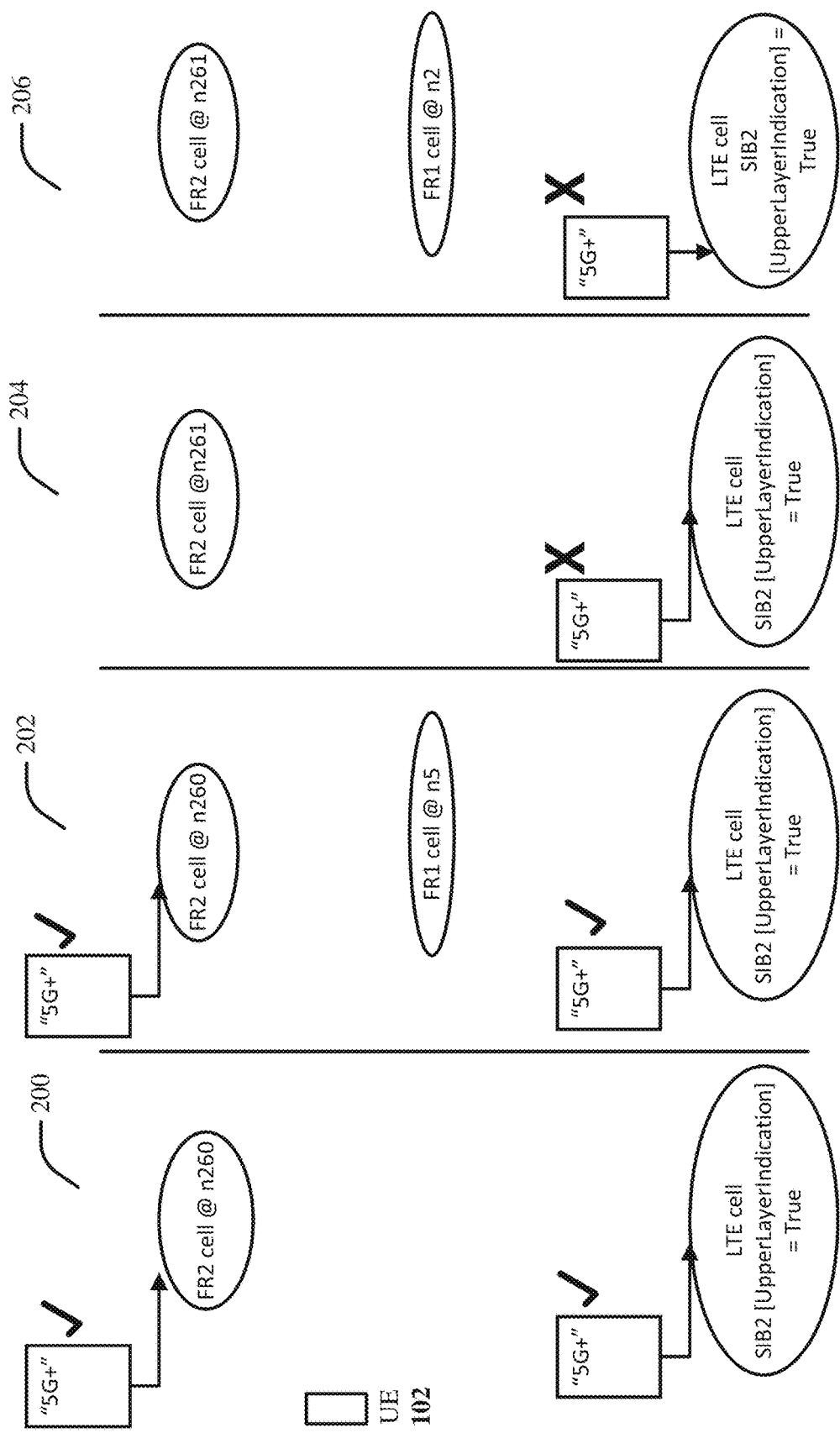
FIG. 2 illustrates an example schematic system block diagram of an LTE/FR2 UE transitioning to various network configurations according to one or more embodiments.

FIG. 2 illustrates an example schematic system block diagram of an LTE/FR2 UE transitioning to various network configurations according to one or more embodiments.

In a non-standalone system, where a UE 102 (e.g., configured to operate using FR2 at band n260), transitions into various network configurations (e.g., areas 200-206), the LTE cell can inform the UE 102 whether 5G is available or not. The UE 102 can display the wireless service icon (e.g., "5G+", "5G" or any icon designating technology being used) if the 5G is available. Otherwise, the UE 102 can display the long term evolution icon ("LTE") if upper layer indication is true. The availability determination is based on whether the mobile device (e.g., UE 102) match both the frequency range (e.g., FR1 or FR2) and frequency band with at least one cell operating in the area. For example, area 200 comprises a cell configured for FR2 at band n260. Thus, while UE 102 operates in area 200, the UE 102 can display the "5G+" icon. Area 202 comprises FR2 at band n260 and FR1 at band n5. Thus, while UE 102 operates in area 202, the UE 102 can display the "5G+" icon because at least one cell matches frequency and band configuration. Area 204 comprises cell configured for FR2 at band n261. Although, the frequency range match that of UE 102, the frequency band do not match. Thus, while UE 102 operates in area 204, the UE 102 cannot display the "5G+" icon. Area 206 comprises cells configured for FR1 at band n2 and FR2 at band n261. For area 206, both frequency range or frequency band do not match. Thus, while UE 102 operates in area 206, the UE cannot display the "5G+" icon.

Figure 3:
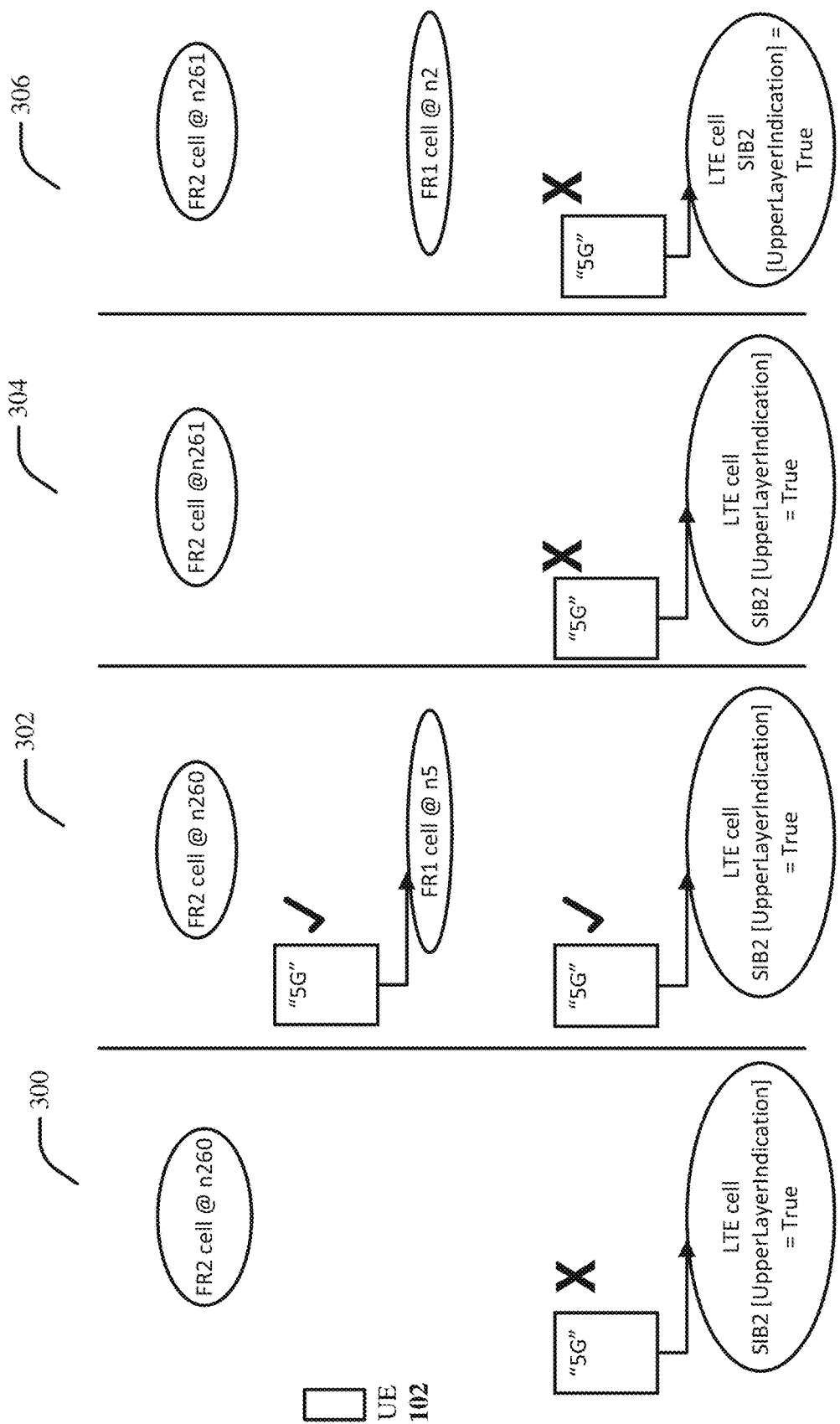
FIG. 3 illustrates an example schematic system block diagram of an LTE/FR1 only UE transitioning to various network configurations according to one or more embodiments.

FIG. 3 illustrates an example schematic system block diagram of an LTE/FR1 UE transitioning to various network configurations according to one or more embodiments.

In a non-standalone system, where a UE 102 (e.g., configured to operate using FR1 at band n5), transitions into various network configurations (e.g., areas 300-306), the LTE cell can inform the UE 102 whether 5G is available or not. The UE 102 can display the wireless service icon (e.g., "5G+", "5G" or any icon designating technology being used) if the 5G is available. Otherwise, the UE 102 can display the long term evolution icon ("LTE") if upper layer indication is true. The availability determination is based on whether the mobile device (e.g., UE 102) both the frequency range (e.g., FR1 or FR2) and frequency band match with cells operating in the area. For example, area 300 comprises a cell configured for FR2 at band n260. Thus, while UE 102 operates in area 300, the UE 102 cannot display the "5G+" icon since the frequency range do not match, FR1 vs. FR2. Area 302 comprises FR2 at band n260 and FR1 at band n5. Thus, while UE 102 operates in area 302, the UE 102 can display the "5G+" icon because at least one cell matches frequency range and frequency band configuration. Area 304 comprises cell configured for FR2 at band n261. Thus, while UE 102 operates in area 304, the UE 102 cannot display the "5G+" icon since the frequency range do not match, FR1 vs. FR2. Area 306 comprises cells configured for FR1 at band n2 and FR2 at band n261. Although, the frequency range match that of UE 102 with at least one of the cells (e.g., FR1 cell at band n2), the frequency band do not match. Thus, while UE 102 operates in area 306, the UE 102 cannot display the "5G+" icon.

Figure 4:
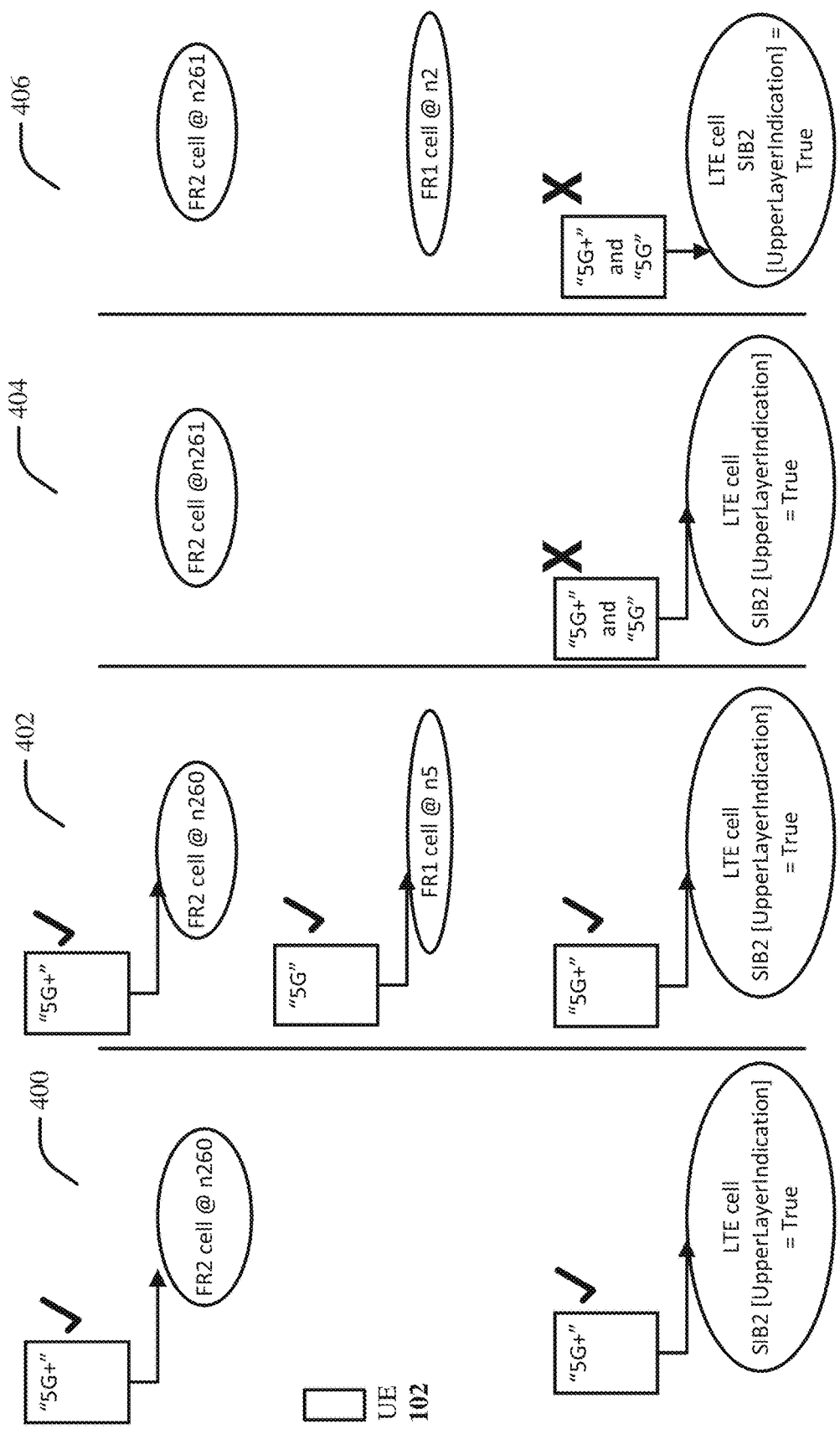
FIG. 4 illustrates an example schematic system block diagram of an LTE/FR1/FR2 UE transitioning to various network configurations according to one or more embodiments.

FIG. 4 illustrates an example schematic system block diagram of an LTE/FR1/FR2 UE transitioning to various network configurations according to one or more embodiments.

In a non-standalone system, where a UE 102 (e.g., configured to operate using FR2 at band n260 and FR1 at band n5), transitions into various network configurations (e.g., areas 400-406), the LTE cell can inform the UE 102 whether 5G is available or not. The UE 102 can display the wireless service icon (e.g., "5G+", "5G" or any icon designating technology being used) if the 5G is available. Otherwise, the UE 102 can display the long term evolution icon ("LTE") if upper layer indication is true. The availability determination is based on whether the mobile device (e.g., UE 102) both the frequency range (e.g., FR1 or FR2) and frequency band match with cells operating in the area. For example, area 400 comprises a cell configured for FR2 at band n260. Thus, while UE 102 operates in area 200, the UE 102 can display the "5G+" icon. Area 402 comprises FR2 at band n260 and FR1 at band n5. Thus, while UE 102 operates in area 402, the UE 102 can display the "5G+" icon because both frequency range and frequency band configuration matched. Area 406 comprises cell configured for FR2 at band n261. Although, the frequency range match that of UE 102, the frequency band do not match. Thus, while UE 102 operates in area 406, the UE cannot display the "5G+" icon. Area 408 comprises cells configured for FR1 at band n2 and FR2 at band n261. For area 408, although the frequency range is a match, the frequency bands do not match. Thus, while UE 102 operates in area 408, the UE cannot display the "5G+" icon.

FIG. 5 illustrates an example schematic system block diagram of proposed changes for idle mode according to one or more embodiments.

In some embodiment, the system information block (SIB) type 2 can be updated from SIB Type 2 500 to SIB Type 2 502. SIB Type 2 502 can comprise adding a $2^{nd}$ bit where the $1^{st}$ bit is for sub6, and the $2^{nd}$ bit is for mmW, wherein FR1 is for sub6 and FR2 is for mmW. Therefore, a sub6 device (e.g., single mode FR1 device) can look for an FR1 bit and does not care about the FR2 bit. If the FR1 bit is present, then the single mode FR1 device knows that sub6 is available and it can display the 5G icon. If the FR1 bit is not available, then the sub6 device can display an LTE icon. Similarly, a mmW device can look for an FR2 bit. If the FR2 bit is present, then the mmW device knows that mmW is available and it can display the 5G icon. A combination device can look for both bits, determine which of the two NR are available, and enable both icons based on FR1 or FR2. Alternatively, if the carrier just has one requirement for 5G, then the combination device can turn on the icon if the FR1 or the FR2 is present.

In some embodiment, the system information block (SIB) type 2 can be updated to include an index portion comprising 8 bits. Each bit is used as in index to a table comprising one or more frequency band supported by the network device. This indexing provides additional granularity over using FR1 and FR2.

Figure 6:
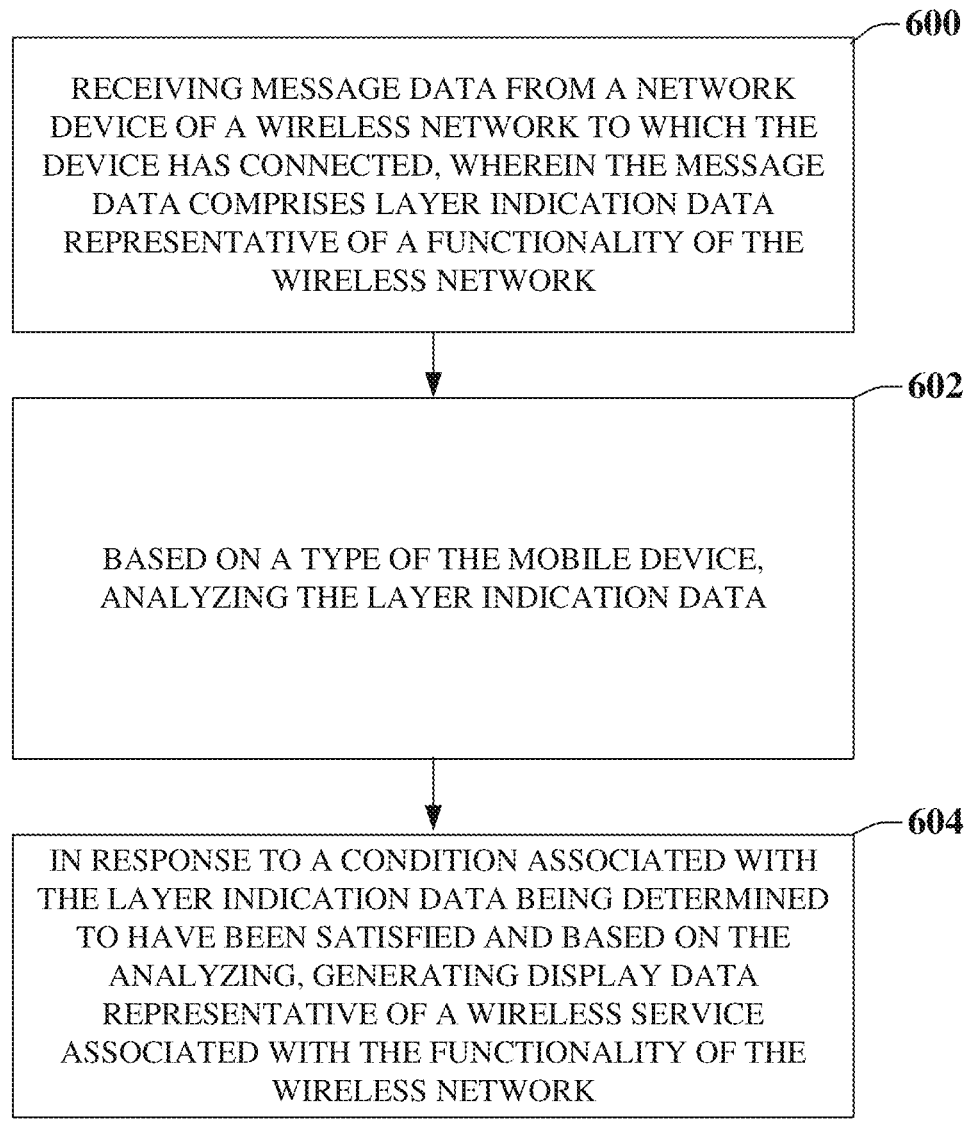
FIG. 6 illustrates an example flow diagram for a method for facilitating display of icons for user equipment transitioning to various network configurations for a 5G network according to one or more embodiments.

FIG. 6 illustrates an example flow diagram for a method for facilitating display of icons for user equipment transitioning to various network configurations for a 5G network according to one or more embodiments.

At element 600, a method can comprise receiving (e.g., by UE 102) message data from a network device (e.g., network node 106) of a wireless network to which the mobile device (e.g., by UE 102) is connected, wherein the message data comprises layer indication data representative of a functionality of the wireless network. Based on a type of the mobile device (e.g., by UE 102), at element 602, the method can comprise analyzing the layer indication data. Additionally, in response to a condition associated with the layer indication data being determined to have been satisfied and based on the analyzing, at element 604, the method can comprise generating (e.g., by UE 102) display data representative of a wireless service associated with the functionality of the wireless network.

Figure 7:
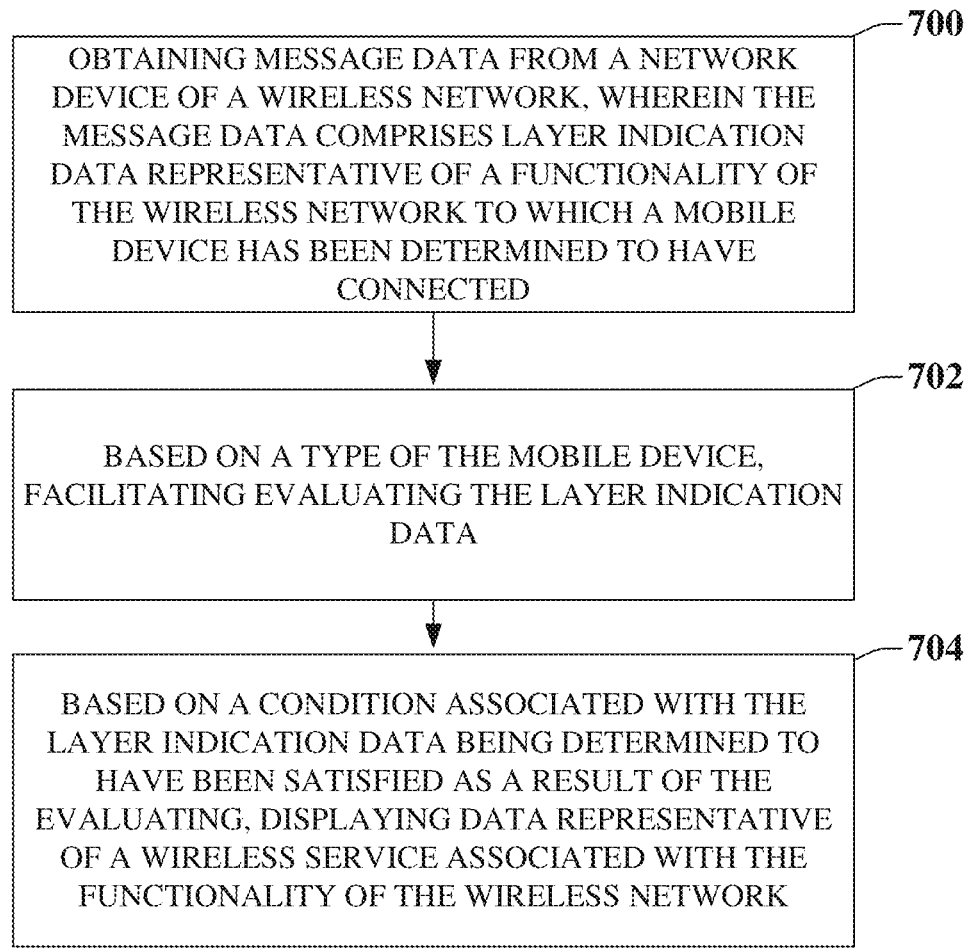
FIG. 7 illustrates an example flow diagram for a system for facilitating display of icons for user equipment transitioning to various network configurations for a 5G network according to one or more embodiments.

FIG. 7 illustrates an example flow diagram for a system for facilitating display of icons for user equipment transitioning to various network configurations for a 5G network according to one or more embodiments.

At element 700, a system can facilitate, obtaining message data (e.g., by UE 104) from a network device (e.g., network node 106) of a wireless network, wherein the message data comprises layer indication data representative of a functionality of the wireless network to which a mobile device (e.g., by UE 104) has been determined to have connected. Based on a type of the mobile device (e.g., by UE 104), the system can comprise facilitating evaluating the layer indication data at element 702. Furthermore, at element 704, based on a condition associated with the layer indication data being determined to have been satisfied as a result of the evaluating, the system can comprise displaying data (e.g., via UE 104) representative of a wireless service associated with the functionality of the wireless network.

Figure 8:
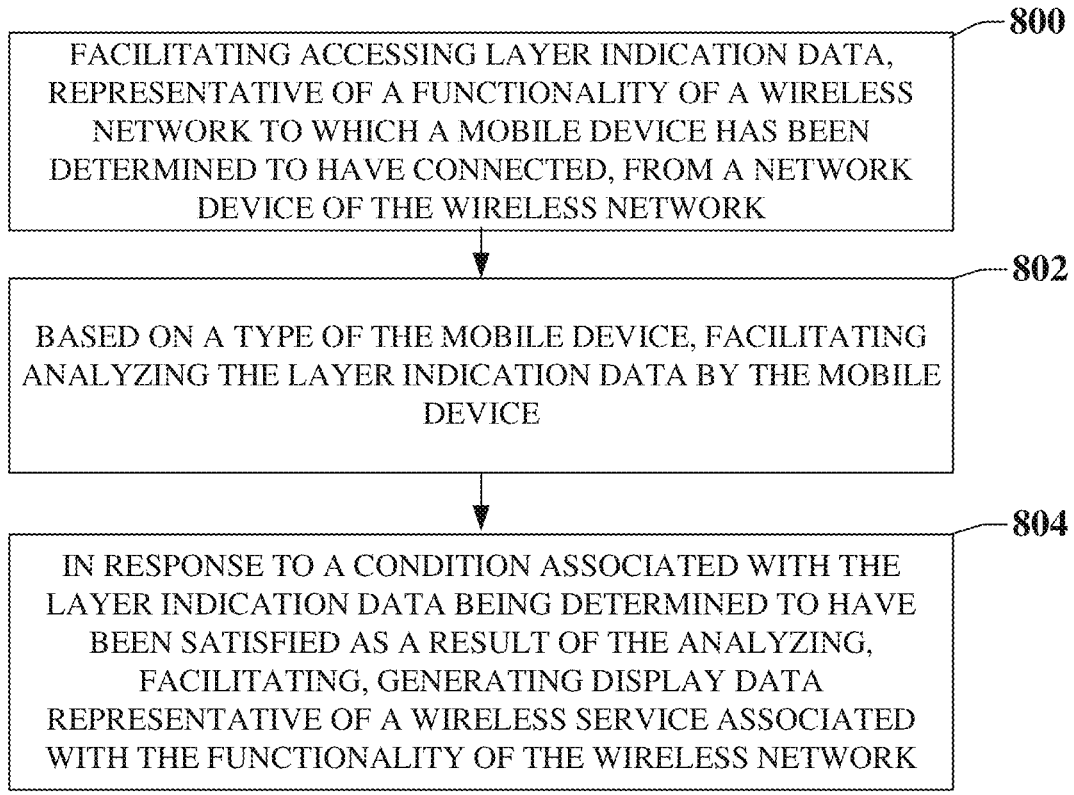
FIG. 8 illustrates an example flow diagram for a machine-readable medium for facilitating display of icons for user equipment transitioning to various network configurations for a 5G network according to one or more embodiments.

FIG. 8 illustrates an example flow diagram for a machine-readable medium for facilitating display of icons for user equipment transitioning to various network configurations for a 5G network according to one or more embodiments.

At element 800, a machine-readable storage medium can perform the operations comprising facilitating accessing layer indication data, representative of a functionality of a wireless network to which a mobile device (e.g., by UE 406) has been determined to have connected, from a network device (e.g., network node 106) of the wireless network. Based on a type of the mobile device (e.g., by UE 406), at element 802, the machine-readable storage medium can comprise facilitating analyzing the layer indication data by the mobile device (e.g., by UE 406). Additionally, in response to a condition associated with the layer indication data being determined to have been satisfied as a result of the analyzing, at element 804, the machine-readable storage medium can comprise generating (e.g., by UE 406) display data representative of a wireless service associated with the functionality of the wireless network.

Figure 9:
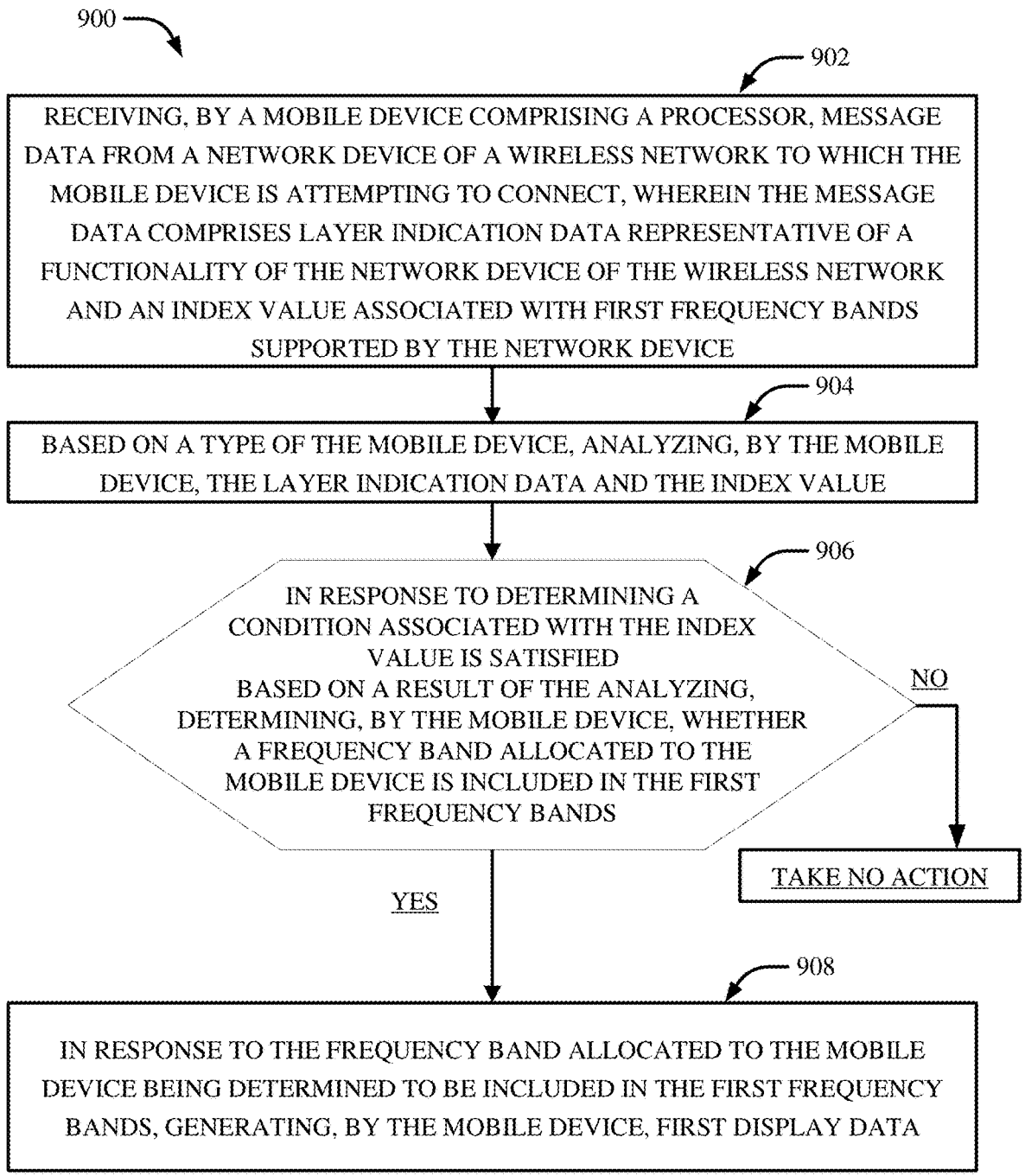
FIG. 9 depicts a diagram of an example, non-limiting computer implemented method that facilitates displaying a wireless service icon based on frequency band indexing in accordance with one or more embodiments described herein.

FIG. 9 depicts a diagram of an example, non-limiting computer implemented method that facilitates displaying a wireless service icon based on frequency band indexing in accordance with one or more embodiments described herein. In some examples, flow diagram 900 can be implemented by operating environment 1000 described below. It can be appreciated that the operations of flow diagram 900 can be implemented in a different order than is depicted.

In non-limiting example embodiments, a computing device (or system) (e.g., computer 1002) is provided, the device or system comprising one or more processors and one or more memories that stores executable instructions that, when executed by the one or more processors, can facilitate performance of the operations as described herein, including the non-limiting methods as illustrated in the flow diagrams of FIG. 9.

Operation 902 depicts receiving, by a mobile device comprising a processor, message data from a network device of a wireless network to which the mobile device is attempting to connect, wherein the message data comprises layer indication data representative of a functionality of the network device of the wireless network and an index value associated with first frequency bands supported by the network device (e.g., when a mobile device attempts to connect to a network device, such as eNB, the mobile device will receive a message, e.g., SIB2, indicating an index value that represents the supported frequency bands). Operation 904 depicts based on a type of the mobile device, analyzing, by the mobile device, the layer indication data and the index value. Operation 906 depicts in response to determining a condition associated with the index value is satisfied based on a result of the analyzing, determining, by the mobile device, whether a frequency band allocated to the mobile device is included in the first frequency bands. If determined that the frequency band allocated to the mobile device is included in the first frequency bands, then perform operation 908. Otherwise, take no action and continue monitoring. requesting, Operation 906 depicts in response to the frequency band allocated to the mobile device being determined to be included in the first frequency bands, generating, by the mobile device, first display data.

Figure 10:
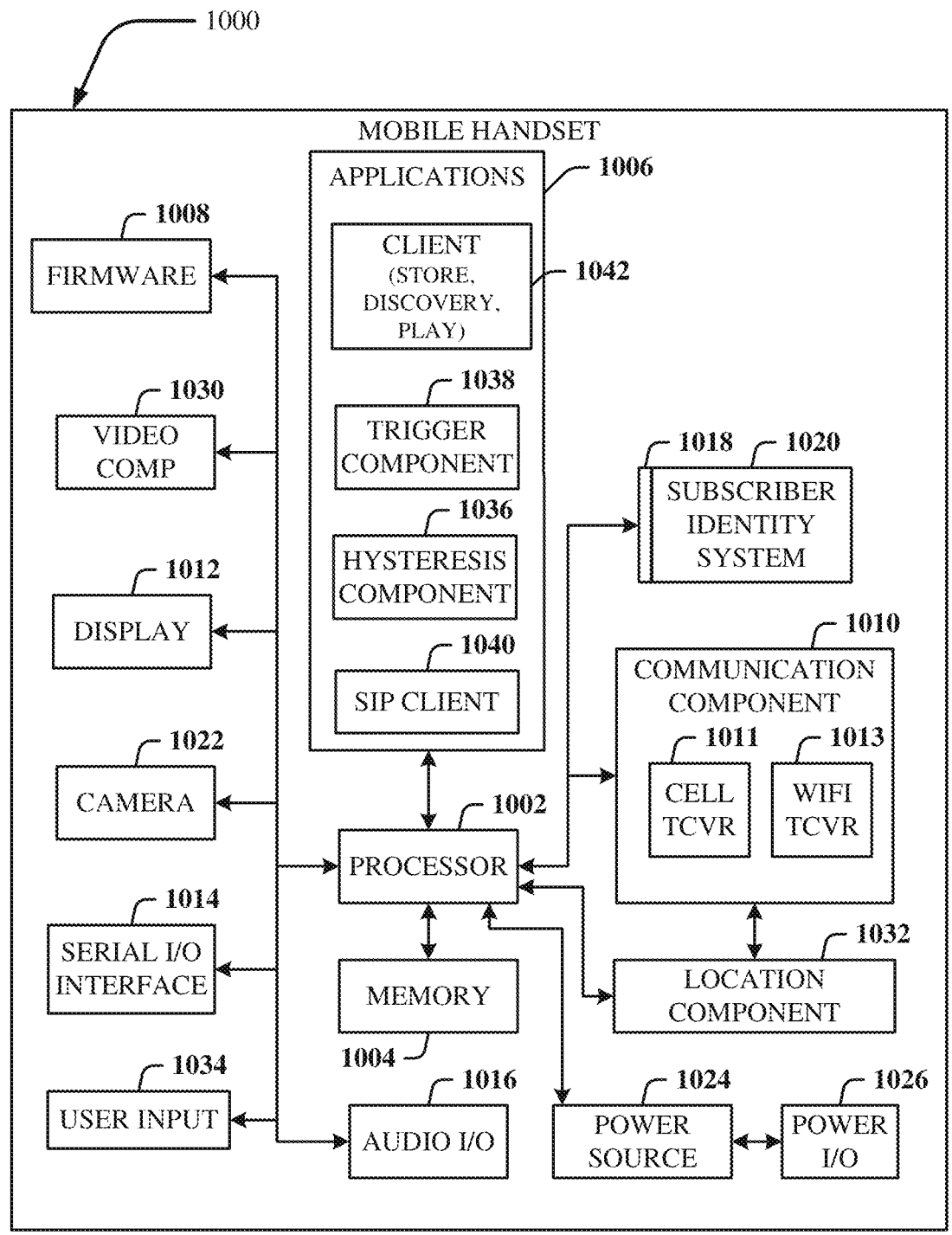
FIG. 10 illustrates an example block diagram of an example mobile handset operable to engage in a system architecture that facilitates wireless communications according to one or more embodiments described herein.

Referring now to FIG. 10, illustrated is an example block diagram of an example mobile handset 1000 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 1002 for controlling and processing all onboard operations and functions. A memory 1004 interfaces to the processor 1002 for storage of data and one or more applications 1006 (e.g., a video player software, user feedback component software, etc.). Other applications can include voice recognition of predetermined voice commands that facilitate initiation of the user feedback signals. The applications 1006 can be stored in the memory 1004 and/or in a firmware 1008, and executed by the processor 1002 from either or both the memory 1004 or/and the firmware 1008. The firmware 1008 can also store startup code for execution in initializing the handset 1000. A communications component 1010 interfaces to the processor 1002 to facilitate wired/wireless communication with external systems, e.g., cellular networks, VoIP networks, and so on. Here, the communications component 1010 can also include a suitable cellular transceiver 1011 (e.g., a GSM transceiver) and/or an unlicensed transceiver 1013 (e.g., Wi-Fi, WiMax) for corresponding signal communications. The handset 1000 can be a device such as a cellular telephone, a PDA with mobile communications capabilities, and messaging-centric devices. The communications component 1010 also facilitates communications reception from terrestrial radio networks (e.g., broadcast), digital satellite radio networks, and Internet-based radio services networks.

The handset 1000 includes a display 1012 for displaying text, images, video, telephony functions (e.g., a Caller ID function), setup functions, and for user input. For example, the display 1012 can also be referred to as a "screen" that can accommodate the presentation of multimedia content (e.g., music metadata, messages, wallpaper, graphics, etc.). The display 1012 can also display videos and can facilitate the generation, editing and sharing of video quotes. A serial I/O interface 1014 is provided in communication with the processor 1002 to facilitate wired and/or wireless serial communications (e.g., USB, and/or IEEE 1094) through a hard-wire connection, and other serial input devices (e.g., a keyboard, keypad, and mouse). This can support updating and troubleshooting the handset 1000, for example. Audio capabilities are provided with an audio I/O component 1016, which can include a speaker for the output of audio signals related to, for example, indication that the user pressed the proper key or key combination to initiate the user feedback signal. The audio I/O component 1016 also facilitates the input of audio signals through a microphone to record data and/or telephony voice data, and for inputting voice signals for telephone conversations.

The handset 1000 can include a slot interface 1018 for accommodating a SIC (Subscriber Identity Component) in the form factor of a card Subscriber Identity Module (SIM) or universal SIM 1020, and interfacing the SIM card 1020 with the processor 1002. However, it is to be appreciated that the SIM card 1020 can be manufactured into the handset 1000, and updated by downloading data and software.

The handset 1000 can process IP data traffic through the communications component 1010 to accommodate IP traffic from an IP network such as, for example, the Internet, a corporate intranet, a home network, a person area network, etc., through an ISP or broadband cable provider. Thus, VoIP traffic can be utilized by the handset 1000 and IP-based multimedia content can be received in either an encoded or decoded format.

A video processing component 1022 (e.g., a camera) can be provided for decoding encoded multimedia content. The video processing component 1022 can aid in facilitating the generation, editing, and sharing of video quotes. The handset 1000 also includes a power source 1024 in the form of batteries and/or an AC power subsystem, which power source 1024 can interface to an external power system or charging equipment (not shown) by a power I/O component 1026.

The handset 1000 can also include a video component 1030 for processing video content received and, for recording and transmitting video content. For example, the video component 1030 can facilitate the generation, editing and sharing of video quotes. A location tracking component 1032 facilitates geographically locating the handset 1000. As described hereinabove, this can occur when the user initiates the feedback signal automatically or manually. A user input component 1034 facilitates the user initiating the quality feedback signal. The user input component 1034 can also facilitate the generation, editing and sharing of video quotes. The user input component 1034 can include such conventional input device technologies such as a keypad, keyboard, mouse, stylus pen, and/or touchscreen, for example.

Referring again to the applications 1006, a hysteresis component 1036 facilitates the analysis and processing of hysteresis data, which is utilized to determine when to associate with the access point. A software trigger component 1038 can be provided that facilitates triggering of the hysteresis component 1036 when the Wi-Fi transceiver 1013 detects the beacon of the access point. A SIP client 1040 enables the handset 1000 to support SIP protocols and register the subscriber with the SIP registrar server. The applications 1006 can also include a client 1042 that provides at least the capability of discovery, play and store of multimedia content, for example, music.

The handset 1000, as indicated above related to the communications component 1010, includes an indoor network radio transceiver 1013 (e.g., Wi-Fi transceiver). This function supports the indoor radio link, such as IEEE-802.11, for the dual-mode GSM handset 1000. The handset 1000 can accommodate at least satellite radio services through a handset that can combine wireless voice and digital radio chipsets into a single handheld device.

Figure 11:
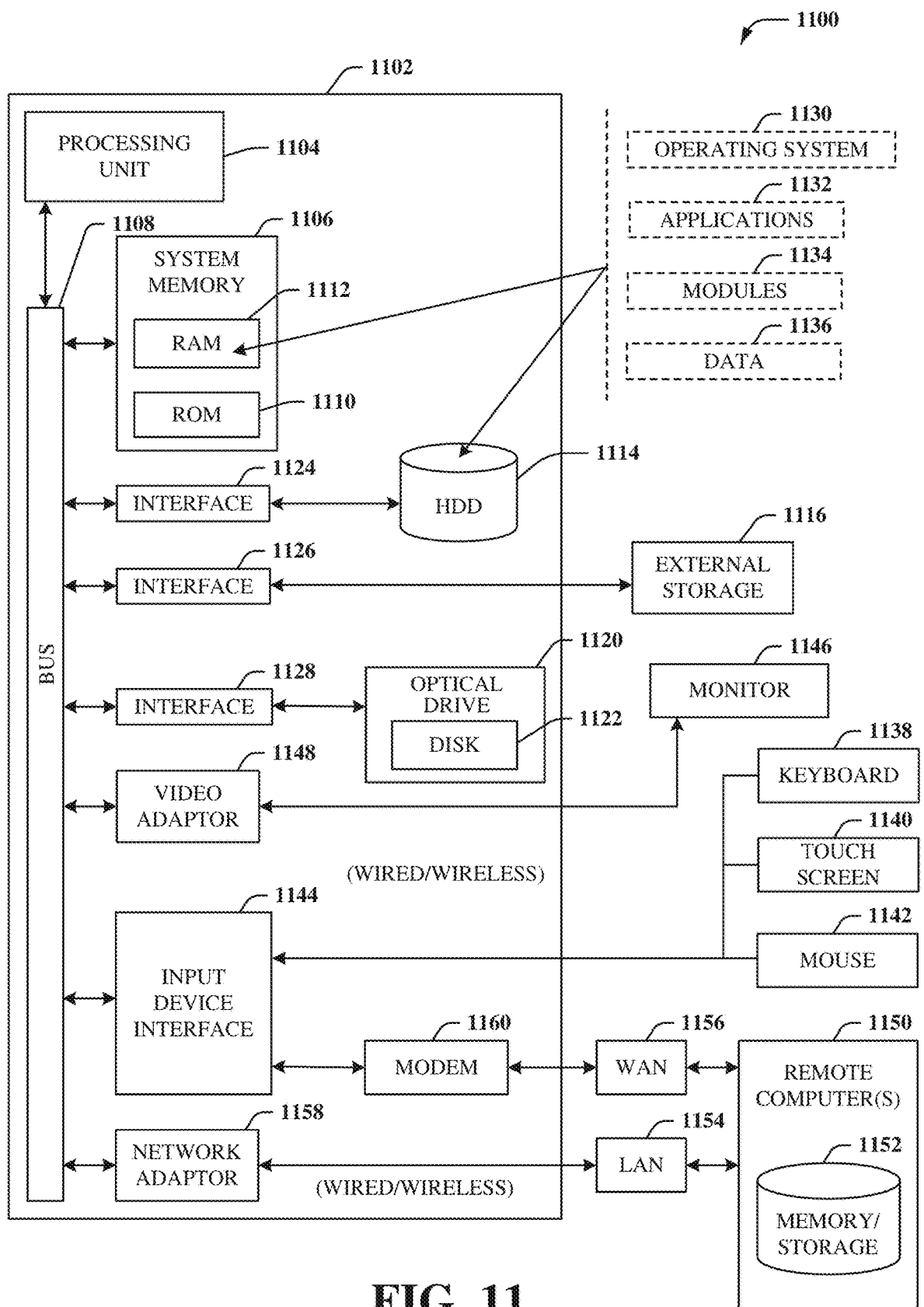
FIG. 11 illustrates an example block diagram of an example computer operable to engage in a system architecture that facilitates secure wireless communication according to one or more embodiments described herein.

Referring now to FIG. 11, illustrated is an example block diagram of an example computer 1100 operable to engage in a system architecture that facilitates wireless communications according to one or more embodiments described herein. The computer 1100 can provide networking and communication capabilities between a wired or wireless communication network and a server and/or communication device.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," "relay device," "node," "point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the embodiments are not to be limited to any single implementation, but rather are to be construed in breadth, spirit and scope in accordance with the appended claims.

What is claimed is:

1. A system, comprising:
   a processor; and
   a memory that stores executable instructions that, when executed by the processor, facilitate performance of operations, comprising:
   receiving a communication from a network node device of a wireless network to which a mobile device is attempting to connect, wherein the communication comprises layer indication data representative of a functionality of the network node device of the wireless network and an index value associated with first frequency bands supported by the network node device;
   analyzing the layer indication data and the index value;
   in response to determining a condition associated with the index value is satisfied based on a result of the analyzing, determining whether a frequency band allocated to the mobile device is included in the first frequency bands; and
   in response to the frequency band allocated to the mobile device being determined to be included in the first frequency bands, generating first display data.

2. The system of claim 1, wherein the condition is a first condition, and the operations further comprise:
   in response to determining a second condition associated with the layer indication data has been satisfied and determining the first condition associated with the index value has not been satisfied based on the result of the analyzing, generating, second display data different than the first display data.

3. The system of claim 2, wherein the first condition is associated with a compatibility of the mobile device to use the index value to identify the first frequency bands.

4. The system of claim 2, wherein the operations further comprise:
   in response to the generating the second display data, facilitating displaying an icon indicative of a long term evolution wireless network via a display of the mobile device.

5. The system of claim 4, wherein the index value represents an index to a supported frequency bands table organized by the index value.

6. The system of claim 1, wherein the mobile device is a sub6 capable mobile device.

7. The system of claim 1, wherein the operations further comprise:
   in response to the generating the first display data, facilitating, by the mobile device, displaying an icon indicative of a generation of the wireless network via a display of the mobile device.

8. A method, comprising:
   receiving, by a mobile device comprising a processor, message data from a network device of a wireless network to which the mobile device is attempting to connect, wherein the message data comprises layer indication data representative of a functionality of the network device of the wireless network and an index value associated with first frequency bands supported by the network device;
   based on a type of the mobile device, analyzing, by the mobile device, the layer indication data and the index value;
   in response to determining a condition associated with the index value is satisfied based on a result of the analyzing, determining, by the mobile device, whether a frequency band allocated to the mobile device is included in the first frequency bands; and
   in response to the frequency band allocated to the mobile device being determined to be included in the first frequency bands, generating, by the mobile device, first display data.

9. The method of claim 8, wherein the condition is a first condition, and further comprising:
   in response to determining a second condition associated with the layer indication data has been satisfied and determining the first condition associated with the index value has not been satisfied based on the result of the analyzing, generating, by the mobile device, second display data different than the first display data.

10. The method of claim 9, wherein the first condition is associated with a compatibility of the mobile device to use the index value to identify the first frequency bands.

11. The method of claim 9, further comprising:
    in response to the generating the second display data, facilitating, by the mobile device, displaying an icon indicative of a long term evolution wireless network via a display of the mobile device.

12. The method of claim 11, wherein the index value represents an index to a supported frequency bands table organized by the index value.

13. The method of claim 8, wherein the mobile device is a sub6 capable mobile device.

14. The method of claim 8, further comprising:
    in response to the generating the first display data, facilitating, by the mobile device, displaying an icon indicative of a fifth generation wireless network via a display of the mobile device.

15. A non-transitory machine-readable storage medium, comprising executable instructions that, when executed by a processor, facilitate performance of operations, comprising:
    in response to requesting a connection, receiving a message from a network device of a wireless network to which a mobile device is establishing a connection, wherein the message comprises layer indication data representative of a functionality of the network device of the wireless network and an index value associated with first frequency bands supported by the network device;
    based on a type of the mobile device, evaluating the layer indication data and the index value;
    in response to determining a condition associated with the index value is satisfied based on a result of the evaluating, determining whether a frequency band allocated to the mobile device is included in the first frequency bands; and
    in response to the frequency band allocated to the mobile device being determined to be included in the first frequency bands, generating first display data.

16. The non-transitory machine-readable medium of claim 15, wherein the condition is a first condition, and wherein the operations further comprise:
    in response to determining a second condition associated with the layer indication data has been satisfied and determining the first condition associated with the index value has not been satisfied based on the result of the evaluating, generating second display data different than the first display data.

17. The non-transitory machine-readable medium of claim 16, wherein the first condition is associated with a compatibility of the mobile device to use the index value to identify the first frequency bands.

18. The non-transitory machine-readable medium of claim 16, wherein the operations further comprise:
   in response to the generating the second display data, facilitating displaying an icon indicative of a long term evolution wireless network via a display of the mobile device.

19. The non-transitory machine-readable medium of claim 18, wherein the index value represents an index to a supported frequency bands table organized by the index value.

20. The non-transitory machine-readable medium of claim 15, wherein the operations further comprise:
   in response to the generating the first display data, facilitating displaying an icon indicative of a fifth generation wireless network via a display of the mobile device.

\* \* \* \* \*